(12) United States Patent
Pellegatta

(10) Patent No.: US 7,284,778 B1
(45) Date of Patent: Oct. 23, 2007

(54) DEVICE FOR CARRYING PREFORMS COMPRISING IMPROVED GRIPPING MEANS

(75) Inventor: Jean-Louis Pellegatta, Octeville-sur-Mer (FR)

(73) Assignee: Sidel, Octeville-sur-Mer (FR)

( * ) Notice: Subject to any disclaimer, the term of this patent is extended or adjusted under 35 U.S.C. 154(b) by 0 days.

(21) Appl. No.: 09/913,823

(22) PCT Filed: Feb. 14, 2000

(86) PCT No.: PCT/FR00/00354

§ 371 (c)(1), (2), (4) Date: Jan. 3, 2002

(87) PCT Pub. No.: WO00/48819

PCT Pub. Date: Aug. 24, 2000

(30) Foreign Application Priority Data

Feb. 18, 1999 (FR) .................................. 99 02586

(51) Int. Cl.
*B66C 1/00* (2006.01)
*B66C 1/42* (2006.01)
*B29C 45/00* (2006.01)

(52) U.S. Cl. ........................ 294/90; 294/902; 425/526; 425/533

(58) Field of Classification Search .................. 294/90, 294/93, 94, 33, 87.2, 902; 198/470.1, 803.12, 198/3, 7, 803.3, 803.7, 803.8; 425/534, 520, 425/528, 533, 537, 538, 526
See application file for complete search history.

(56) References Cited

U.S. PATENT DOCUMENTS 3,894,630 A * 7/1975 Shank, Jr. .................... 294/106
3,958,685 A * 5/1976 McDonald et al. ......... 294/82.28
4,086,999 A * 5/1978 McDonald ................... 294/93
4,190,406 A * 2/1980 Geck et al. .................. 294/93
4,435,146 A * 3/1984 Wiatt et al. .............. 198/803.7
4,456,447 A * 6/1984 Smith ......................... 294/115
4,564,497 A * 1/1986 Ota et al. .................... 425/526
4,572,355 A * 2/1986 Hunter ........................ 294/94
4,615,667 A * 10/1986 Roy ............................ 425/135
4,763,778 A * 8/1988 Feddersen et al. ..... 198/867.08
4,890,726 A * 1/1990 Wissmann ................... 294/93
4,988,399 A * 1/1991 Watson et al. ............... 264/454
5,290,506 A * 3/1994 Yokobayashi ............... 425/526
5,322,651 A * 6/1994 Emmer ....................... 425/526
5,631,030 A * 5/1997 Brun et al. .................. 425/526
5,769,476 A * 6/1998 Lawn et al. ............... 294/99.1
6,171,541 B1 * 1/2001 Neter et al. ................. 425/534
6,461,556 B1 * 10/2002 Neter ......................... 425/547
6,464,919 B2 * 10/2002 Dubuis et al. .............. 425/526

FOREIGN PATENT DOCUMENTS

WO    WO89/00140    1/1989

* cited by examiner

*Primary Examiner*—Patrick Mackey
*Assistant Examiner*—Paul T Chin
(74) *Attorney, Agent, or Firm*—Sughrue Mion Pllc.

(57) ABSTRACT

A device for carrying a preform in a temperature condition oven, including a gripping device provided with gripping claws, which enclose an outer surface of the neck of the preform. An inner core is provided that penetrates axially inside the neck over a distance substantially equal to the axial length of the neck, such that it presents a lower transverse surface. When the preform is in place on the gripping device, it is substantially axially placed at the boundary between the neck and the body of the preform.

25 Claims, 3 Drawing Sheets

DEVICE FOR CARRYING PREFORMS COMPRISING IMPROVED GRIPPING MEANS

BACKGROUND OF THE INVENTION

The present invention relates to the field of processes for manufacturing hollow bodies of thermoplastic materials, in which a preform is first manufactured by injection before obtaining the final container during a blow forming stage.

The preform obtained by injection generally presents a tubular cylindrical body that is closed at one of its axial ends and which is extended at its other end by a neck, which is also tubular. The neck is generally injected so that it already has its final form, while the body of the preform is required to undergo a relatively significant deformation, in order to form the final container following a blow forming operation.

In order to be able to proceed to this blow forming operation, the body of the preform must be carried at a temperature that is higher than the vitreous transition temperature of the material. To that end, the preform is temperature conditioned by circulating it inside an oven. The oven has heating means formed from infrared lamps, for example, in front of which the preform is moved by a carrying device.

However, when the preform is carried inside the oven, care must be taken that the neck of the preform be heated as little as possible, to prevent it from becoming deformed, because it is already in its final form. To do this, it is known that two protection ramps can be arranged in the oven along the path of the preform, which protection ramps are placed on either side of the preform, just at the level of the boundary between its neck and its body. In this way, the ramps form a screen and the lamps can not emit rays directly toward the neck of the preform.

However, because the rays emitted by the lamps are propagated in all directions, some of the rays emitted by the lamp can reach the neck after penetrating to the interior of the preform.

Indeed, the preforms are generally held on the carrying device by a gripping device formed from a mandrel, which is engaged inside the neck of the preform, and which holds said preform by tightening against the internal face of the neck. In this case, the tightened mandrel prevents the rays that have penetrated into the interior of the preform from reaching the neck.

However, for certain applications it is advantageous not to hold the preforms by the internal face of the neck, for example in order to avoid any bacteriological contamination of that surface, if it is brought into contact with the product with which the container will be filled. This also makes it possible to eliminate any risk of scratching the internal face of the neck.

One solution to this problem consists in providing a gripping device for the bottle which cooperates with the external face of the neck of the preform. However, such an arrangement can result in the neck being heated by the rays that have penetrated into the interior of the preform, which should be avoided at any cost. This problem becomes particularly acute when the container being manufactured is a container having a neck with a large diameter, for example on the order of 80 millimeters. The cross section through which the rays pass to the interior of the preform is then particularly large.

SUMMARY OF THE INVENTION

A purpose of the invention is therefore to propose a new design of the gripping device for the preform that makes it possible to provide the best protection to the neck of the preform, particularly against excessive heating.

To that end, the invention proposes a device for carrying a preform in the temperature conditioned oven of a machine for blow forming containers of thermoplastic material, of the type in which the preform is obtained by injection molding and has, at one upper axial end of its body, a tubular neck that is directly injected to its final form, and of the type in which the preform is held on the carrying device by a gripping device, characterized in that the gripping device comprises gripping claws that enclose an outer surface of the neck to hold the preform, and it comprises an inner core that penetrates axially inside the neck such that it presents a lower transverse surface which, when the preform is in place on the gripping device, is substantially axially situated at the boundary between the neck and the body of the preform.

According to other characteristics of the invention:
- the lower transverse surface of the core forms a reflecting surface for the heating energy provided by the oven;
- the diameter of the core is substantially equal to but less than the inside diameter of the neck of the preform;
- the core is extended upward in the form of a radiator that allows the heat absorbed by the core to be dissipated;
- the gripping claws are made in the form of a bell open at the bottom, inside which the neck of the preform is axially engaged, the bell being provided with a series of radial slots that are angularly distributed so as to delimit, between two successive slots, one gripping claw that is elastically radially deformable;
- the bell is formed from a circular upper transverse plate from which a tubular skirt extends axially downward, the inside diameter of the skirt, at least for part of its length, being of smaller diameter than the outside diameter of the neck so that the claws engage on the neck by tightening it radially;
- the bell is made of plastic material;
- it has a circular spring that encircles the bell at the lower end of the claws to pull them radially inward;
- the gripping device is rotatably mounted around its axis on the carrying device, which also carries the ejection means, making it possible to loosen the preform from the gripping device; the ejection means are arranged above the gripping device and have at least one finger that extends axially downward, and it is provided with means for the relative axial displacement of the gripping device and ejection means in such a way that, during a relative ejection stroke, the ejection finger is placed against the preform, in order to move it axially downward with respect to the gripping device;
- the gripping device is mounted so as to be axially movable on the carrying device and the ejection means are attached axially but rotatably movable with respect to the carrying device;
- during a relative ejection stroke, the ejection finger passes through an orifice in the upper plate of the gripping bell and is received in an aperture made in the periphery of the core.

The invention also concerns a temperature conditioning oven for a plastic container blow forming facility, characterized in that it has a carrying device incorporating any one of the preceding characteristics.

BRIEF DESCRIPTION OF THE DRAWINGS

Other characteristics and advantages of the invention will appear through reading the following detailed description, as well as in the drawings appended hereto, in which.

Figure 1:
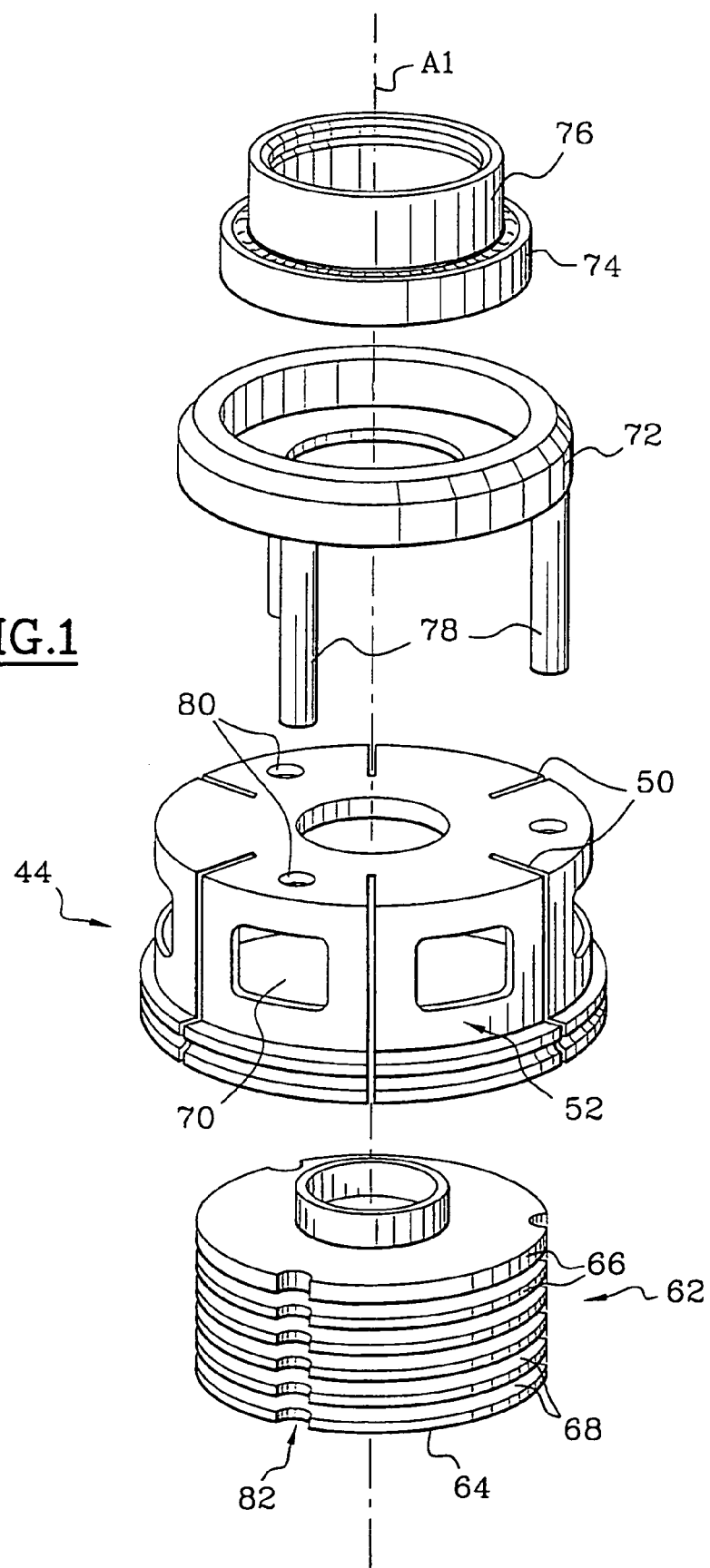
FIG. 1 is a diagrammatic view in perspective illustrating a gripping device and ejection means of a preform according to the methods of the invention.
Figure 2:
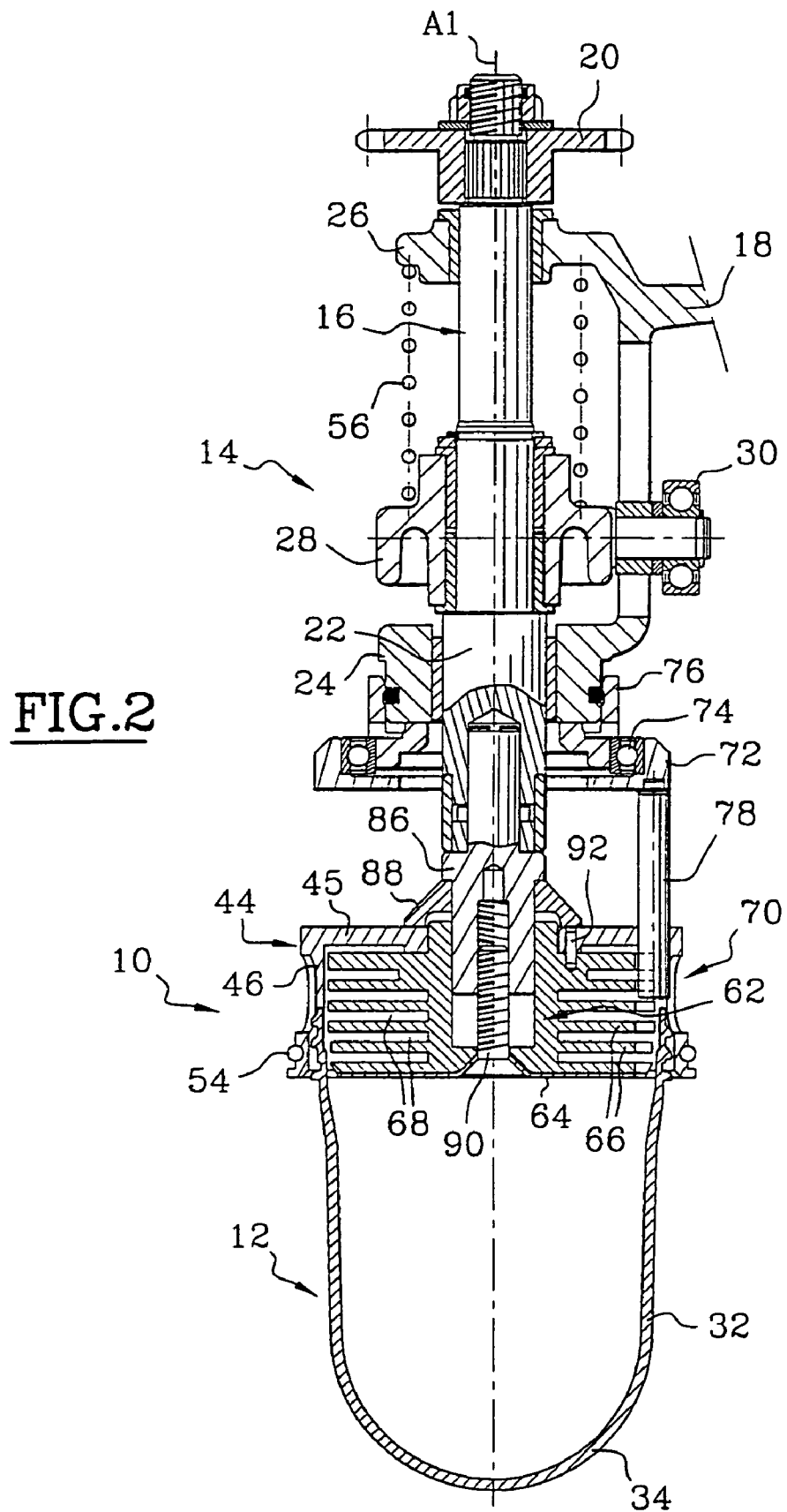
FIG. 2 is an axial cross sectional view of a preform carrying device according to the invention.
Figure 3:
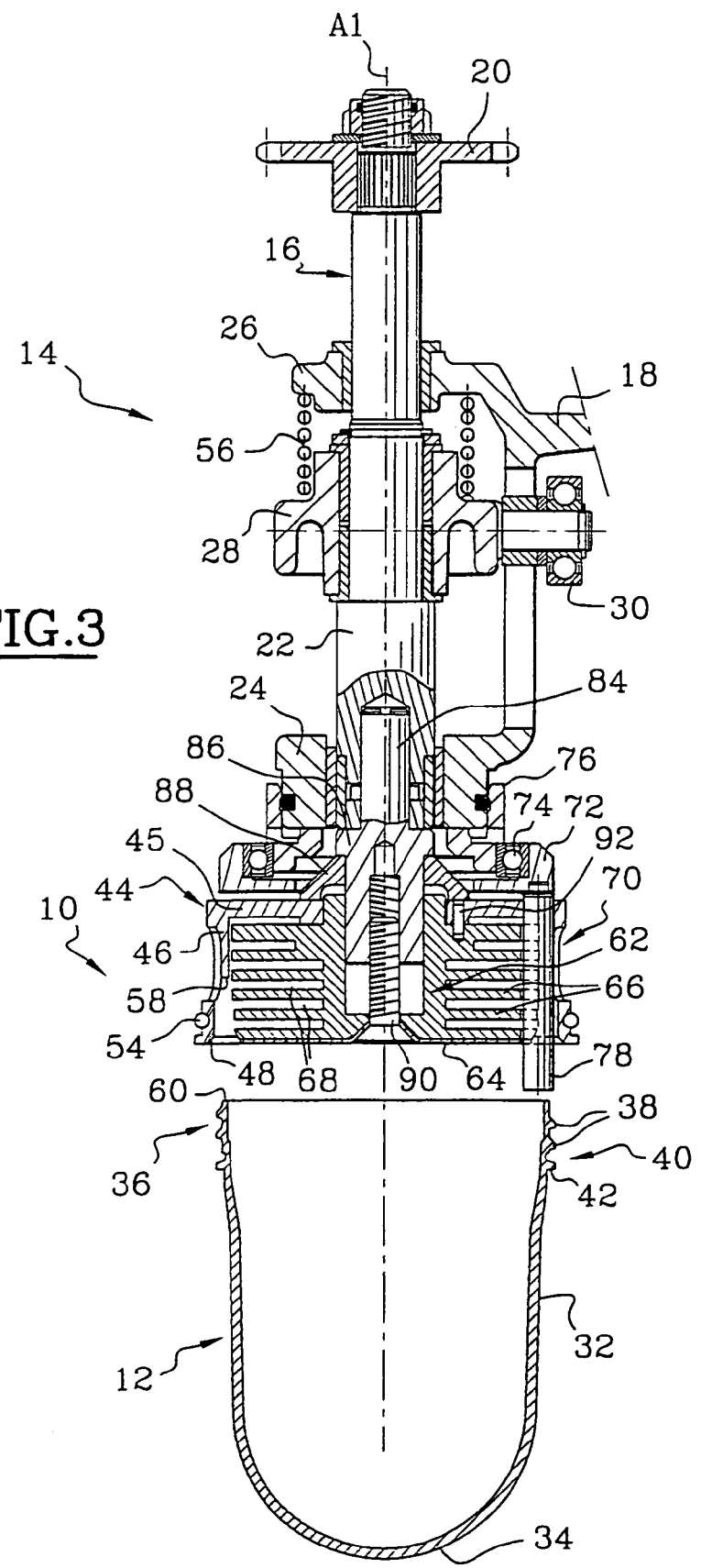
FIG. 3 is a view similar to that of FIG. 2, in which the carrying device is illustrated after the ejection of the preform.

Represented in FIG. 1 is a gripping device 10 for a preform 12. This device is intended to be carried by a carrying device 14 of the preform, one exemplary embodiment of which is illustrated in FIGS. 2 and 3.

DETAILED DESCRIPTION OF ILLUSTRATIVE, NON-LIMITING EMBODIMENTS

The carrying device is intended to provide the circulation of the preform 12 inside a temperature conditioning oven, in order to enable the molding by drawing-blowing of the preform to obtain a container, for example a jar or bottle. In particular, the invention will find application at facilities for blow-molding containers of polyethylene terephtalate (PET), in which previously injection molded preforms are fed into a temperature condition oven, prior to being transferred to the blow molding machine itself.

In such a facility, the oven is provided, for example, with a chain having a series of links that are articulated between each other and each of which is provided with means for carrying a preform. The chain turns around a closed circuit inside the oven and is provided, at the entrance of the oven, with means for loading the preform on a carrier link, and at the outlet of the oven, means for unloading the preform.

The carrying device in the meaning of the invention can therefore take the form of a link in such a chain, but it can also be accomplished in any other known manner.

The carrying device 14 is therefore suited for circulating the preform 12 inside the oven according to a specific path, along which the preform moves in front of heating means, such as infrared lamps.

In order to ensure good homogeneity in heating the body of the preform, it is known that the preform is preferably rotated around its axis A1 all along its path in front of the heating means. To that end, the gripping device 10 of the preform 12 is carried by a shaft 16 with axis A1, which is mounted in rotation around axis A1, on a plate 18 of the carrying device 14. The shaft 16 also carries a toothed wheel 20 which can cooperate with a fixed rack (not represented) placed along the path of the preform 12 in the oven. Thus, when the plate 18 follows its path in the oven, the wheel 20 engages with the rack and causes the rotation of the shaft 16 and thus the rotation of the gripping device 10.

In the following description, it will be seen that the shaft 16 is also movable in transverse displacement along the axis A1 with respect to the plate 18.

For the sake of clarity in the following description, such ideas as high, low, upper, lower, etc., will be used in reference to the arrangement of the elements as represented in FIGS. 1 to 3. However, these ideas should not be interpreted as being limitations to the scope of the invention, especially as it is known that carrier chains which, after gripping the preform oriented with the neck up, allow the link to be turned over so that the preform circulates with the neck down in front of the heating means, before being turned over again for ejection.

Thus, the shaft 16 carries at its upper axial end the toothed wheel 20, at its lower end the gripping device 10, and it has a central section 22 which is guided by two bearings, lower 24 and upper 26, of the plate 18.

To control the axial movements of the shaft 16, a control ring 28 is provided, which is axially integral with the shaft 16, which is movably mounted on the shaft 16 in rotation around the axis A1. The ring 28 is mounted on the center section 22 of the shaft 16. It can therefore be moved axially, with the shaft 16, between the two bearings 24, 26, but it is immobilized in rotation around the axis A1 with respect to the plate 18. The ring 28 has a roller 30, which can cooperate with the fixed inclined ramps (not represented) of the oven, to cause the movement of the shaft 16 between a low position, illustrated in FIG. 2, and a high position, illustrated in FIG. 3.

The preform 12 illustrated in FIGS. 2 and 3 has a conventional body 32. In the example, the body 32 is substantially tubular with axis A1 and is closed at its lower end by a substantially hemispherical bottom 34. The upper end of the preform 12 is composed of a tubular neck 36 with axis A1, which neck has on its outer surface means for the subsequent installation of a cap, these means in this instance being composed of screw threads 38. Beneath the screw threads 38, substantially at the boundary between the neck 36 and the body 32 of the preform 12, [is] a ring-shaped collar 40 that is radially in relief toward the outside. The lower surface 42 of this collar 40 is often used to carry the preform 12 or the final container. Indeed, the neck 36 is directly injection molded to its final form and is not transformed during the blowing operation. Thus the collar constitutes a reference surface that allows easy gripping.

According to a first aspect of the invention, the gripping device 10, carried by the shaft 16, is provided to grip and hold the preform by contact with the outer surface of the neck 36.

To that end, the gripping device 16 has a gripping bell 44, which has a circular upper plate 45 and a cylindrical skirt 46, which extends axially downward from the peripheral edge of the plate 45. The bell 44 therefore defines a cylindrical space open at the bottom, the lower edge of the skirt 46 being provided with an inner chamfer to facilitate the engagement of the neck of the preform in said space.

The bell 44 is radially slotted with six slots 50 distributed angularly around the axis A1. Of course, this number of slots is only given by way of example. Each slot 50 extends radially over about the outer third of the plate 45 and axially over the full height of the skirt 46. Thus, between two slots 50, an elastically deformable claw 52 is delimited, the free end of which, formed by the lower edge of the skirt 46, can be radially moved with respect to the axis A1.

Thus, the bell 44 is intended to be lowered axially, in order to enclose the neck 36 of the preform, the claws 52 elastically tightening on the outer surface of the neck. It can be seen that the inner surface of the free end of the claws 52 is smooth, so that the preform 12 is gripped and held by simple radial tightening. In this instance, the claws 52 grip the preform by cooperating with the top of the thread 38.

The bell 44 is made, for example, of a polyacetal type plastic material. In this case, in order to reinforce the tightening force, a ring-shaped spring 54 can be provided, which fits tightly around the bell 44 at the lower edge of the skirt 46 to force the free end of the claws 52 radially inward.

In the proposed example, the spring 54 is received in a circular groove made on the outer surface of the skirt 46, at its lower edge.

The gripping claws as just described represent only one preferred embodiment of the invention. Indeed, the means that make it possible to grip the preform by the outer surface of the neck could be accomplished differently. In particular, they could be made in the form of lifting tongs with articulated claws, or in the form of a mandrel with concentric jaws.

In the carrying device 14 that is illustrated, the "descending" movement of the shaft 16 and of the gripping device 10 is caused by a compression spring 56, which is placed around the shaft, pressing upward against the upper bearing 26 and downward against the control ring 28. The purpose of the roller 30 is essentially to ensure the "ascent" of the shaft 16 through the action of the spring 56. It can also be used to regulate the speed of the descending movement of the shaft 16 imposed by the shaft 16, for example by cooperating with a raised ramp.

When the preform 12 is loaded, it is taken beneath the carrying device 14, in which the gripping device 10 is in the upper position. The preform is then pressed down, for example, on guide rails by means of its collar 40. When the spring 56 pushes the shaft 16 downward, the bell 44 is engaged on the neck 36 of the preform, until an inner ring-shaped rim 58, formed on the inner surface of the skirt 46, presses against the upper edge 60 of the neck 36. Thus, when the preform 12 is gripped, its axial position is defined with precision.

According to a second aspect of the invention, the gripping device 14 has means for limiting the heating of the neck 36, these means being comprised of an internal core 62 which is integral with the bell 44, which core is arranged inside the space delimited by said bell, and which is designed to be received inside the neck 36 of the preform. According to the invention, it has a transverse lower surface 64 that is perpendicular to the axis A1 and which is placed, when the preform is in place on the gripping device, substantially at the boundary between the neck 36 and the body of the preform. In this instance, the lower surface 64 is arranged at the same level as the lower edge of the skirt 46 of the bell 44 and as the collar 40 of the preform 12.

In the proposed example, the core 62 has a shape such that it matches as closely as possible the inner surface of the neck 36, without, however, coming into contact therewith. However, it will be understood that the first essential function of the core is to form an obstacle to the rays. It can thus be comprised of a simple axial rod having a transverse plate at its lower end.

The lower transverse surface of the core 62 is preferably suitable for reflecting the incident rays. However, in some applications it could be arranged for the core to absorb these rays, at least partially, and means could be provided to evacuate the energy thus stored.

In the proposed example, the lower transverse surface 64 is made in the form of an attached reflector, the bottom face of which is polished to increase its reflective power. However, the inner surface could also be an integral part of the body of the core. By way of example, the reflector and the body of the core are both made of aluminum in order to limit the weight.

According to another aspect of the invention, the body of the core 62 is furnished with fins 66 to facilitate the dissipation of the heat that is absorbed by the lower face 64, despite its reflective nature. According to the proposed example, these fins 66 extend in planes perpendicular to the axis A1, and are axially separated from each other by annular grooves 68 with axis A1 which extend radially toward the interior over more than half the radius of the core 68, from the outer periphery thereof.

In order to evacuate the heat from the fins 66, the claws 52 are furnished with openings 70 that are cut in the tubular skirt 46, and which make it possible to ensure circulation of air between the fins.

Appropriately, an air circulation device will be used for this that is generally provided in an oven of this type to ensure the cooling of the infrared lamps. Part of the air flow from the oven's ventilation system is then channeled to provide for the cooling of the core of each of the carrying devices.

One example of such a ventilation system is described in the document FR-A-2.561.986. In such a system, a negative pressure is created in the oven so that fresh air enters the oven through the opening delimited by the protection ramps that prevent the rays from reaching the outer surface of the neck. Also, in this system, the fresh air drawn toward the oven tends to circulate around the neck of the preforms and can therefore, thanks to the device according to the invention, participate in the cooling of the core 62.

However, fresh air nozzles can also be provided along the path followed by the preforms in the oven, which nozzles are directed specifically toward the gripping device 10 of each of the carrier links.

The core 62 therefore makes it possible to prevent the rays that penetrate into the preform from being able to strike the neck. On the contrary, the lower surface 64 tends to reflect them. Moreover, by ensuring the cooling of the core, its temperature is prevented from rising to the point where it could possibly heat the neck. This risk becomes greater as the diameter of the neck increases, even though it should be noted that the core, not being in contact with the preform, can only heat the neck by convection or by radiation, but not by conduction.

Moreover, the preform carrying device 14, according to the invention, has means that allow a preform held by the gripping device, upon exiting from the oven, to be ejected.

To that end, it is provided with an ejection device that comprises a collar 72 that is fitted with three cylindrical fingers 78, distributed at 120° around a circle with a diameter that is substantially identical, but slightly less, than the diameter of the neck of the preform. The fingers 78 extend axially downward and thus pass through orifices 80 made in the upper plate 45 of the bell 44 and are partially received in the apertures 82 formed in the peripheral surface of the core. The collar 72 that has the fingers 78 is mounted in rotation around the axis A1, owing to a ball bearing 74, on a support 76, which itself is attached to the lower bearing 24 of the plate 18. The ejection device is therefore axially attached with respect to the plate 18.

When the shaft 16 and the gripping device 10 are in the lowered position as illustrated in FIG. 2, the lower end of the fingers 78 is located above the level of the rim 58 of the skirt 46, which forms a stop for the neck 36 of the preform. Also, the fingers 78 do not then interfere with the preform.

On the contrary, when the roller 30 causes the gripper device and thus the preform to rise, the upper edge 60 of the neck of the preform comes into contact with the fingers 78, which are axially fixed. In that way, the gripper device continues to rise, but not the preform, until the neck 36 escapes the claws 52, the preform then being freed as can be seen in FIG. 3.

It will be noticed that the fingers 78 remain continually engaged inside the orifices 80 of the bell 44 and the apertures 82 of the core 62. Also, it is important that the collar 72 that carries them be rotatably movable so that they do not resist the rotation of the gripper device.

Appropriately, the gripper device is mounted on the shaft 16 by a known bayonet device. The gripper device thus comprises a bore 84, an upper part of which forms a bayonet cap intended to be received in a corresponding bushing formed at the lower end of the shaft 16, and a lower part of which bore, provided with a shoulder 86, allows assembly by the axial stacking of a support cone 88, the bell 44 and the core 62. A screw 90 with axis A1, the head of which supports the lower face of the bore 84, is screwed up into the lower part of the bore 84.

The axial stacking is such that the core 62 supports the upper plate 45 of the bell 44, which in turn is supported, by means of the cone 88, by the shoulder 86.

However, the core 62 is centered according to the axis A1 directly over the lower part of the bore 84 and the bell 44 is centered over the core. Moreover, the bell 44 and the core 62 are angularly indexed with respect to each other by a slug 92, which makes it possible to ensure that the orifices 80 of the bell 44 are aligned with the apertures 82 of the core 62.

It will be noted that the bayonet mounting of the gripper device 10 allows very quick assembly and dismantling. This makes it possible to change the type of preforms processed in the oven, particularly when the same oven is to be used to process preforms having different neck diameters. At present, during such a change, all of the gripping devices of the carrier chain must be changed, which can represent more than two hundred units. It is therefore easy to understand the value of the possibility of quick assembly/dismantling of the gripping device. To the same end, FIGS. 2 and 3 show that the ejection device has a support 76 that is attached to the plate 18 by simple elastic fitting.

The invention claimed is:

1. A carrying device for carrying a preform in an oven, the preform including a body and a tubular neck, the carrying device comprising:
   a gripping device having gripping claws which enclose an outer surface of the neck to hold the preform;
   an inner core which penetrates axially inside the neck of the preform, the inner core having a lower transverse surface; and
   the inner core comprising at least one fin which extends radially and is operative to dissipate heat that is absorbed by the inner core, the at least one fin not being in contact with the preform, such that an open channel radially extends from an inner portion of the core along the at least one fin to the neck of the preform to provide an open space inside the preform which is bound by an inner periphery of the neck.

2. The carrying device according to claim 1, wherein the diameter of the core is substantially equal to, but less than, the inside diameter of the neck of the preform.

3. The carrying device according to claim 1, wherein the fin is in the form of a radiator.

4. The carrying device according to claim 1, wherein the gripping claws are made in the form of a bell open at the bottom, inside of which, the neck of the preform is axially engaged, the bell being provided with a series of radial slots that are angularly distributed so as to delimit, between two successive slots, one gripping claw that is elastically radially deformable.

5. The carrying device according to claim 4, wherein the bell is formed from a circular upper transverse plate, from which a tubular skirt extends axially downward, the inside diameter of the skirt, at least for part of its length, having a smaller diameter than the outside diameter of the neck, so that the claws engage on the neck by tightening it radially.

6. The carrying device according to claim 4, wherein the bell is made of plastic.

7. The carrying device according to claim 4, further including a circular spring that encircles the bell at a lower end of the claws to pull them radially inward.

8. The carrying device according to claim 1, wherein the gripping device is rotatably mounted around its axis on the carrying device, the carrying device further including,
   an ejection means, which is operative to loosen the preform from the gripping device, the ejection means being arranged above the gripping device and having at least one ejection finger which extends axially downward, and being provided with means for axially displacing the gripping device and the ejection means in such a way that, during a relative ejection stroke, the ejection finger is placed against the preform in order to move it axially downward with respect to the gripping device.

9. The carrying device according to claim 8, wherein the gripping device is mounted so as to be axially movable on the carrying device, and the ejection means is attached axially, but rotatably movable with respect to the carrying device.

10. The carrying device according to claim 8, wherein during the relative ejection stroke, the ejection finger passes through an orifice in an upper plate of the gripping bell and is received in an aperture made in a periphery of the core.

11. The carrying device according to claim 1, wherein when the preform is in the gripping device, the lower transverse surface is substantially axially situated at the boundary between the neck and the body of the preform.

12. The carrying device according to claim 1, wherein the lower transverse surface of the core forms a reflecting surface for reflecting heating energy provided by the oven.

13. The carrying device according to claim 1, wherein a plurality of fins are provided, such that the adjacent fins are separated by a groove.

14. The carrying device according to claim 1, wherein the gripping device includes radially extending slot portions which allow for the gripping device to elastically deform so as to engage the tubular neck of the preform.

15. The carrying device according to claim 1, wherein lower transverse surface of the inner core is disposed to be axially situated at a boundary between the neck and the body of the preform when the preform is in place on the gripping device.

16. The carrying device according to claim 1, wherein the lower transverse surface is flat.

17. A temperature conditioned oven for a plastic container, comprising:
   a carrying device, said carrying device including;
   a gripping device having gripping claws which are closable around an outer surface of a neck of a preform to hold the preform;
   an inner core which is adapted to penetrate axially inside the neck of the preform, the inner core having a lower transverse surface which forms a reflecting surface for reflecting heating energy provided by the oven; and
   the inner core comprising at least one fin which extends radially and is operative to dissipate heat that is absorbed by the inner core, such that an open channel radially extends from an inner portion of the core along the at least one fin to the neck of the preform to provide an open space inside the preform which is bound by an inner periphery of the neck.

18. A temperature conditioned oven for a plastic container according to claim 17, wherein the lower transverse surface of the inner core is disposed to be axially situated at a boundary between the neck and a body of the preform when the preform is in place on the gripping device.

19. The temperature conditioned oven according to claim 17, wherein the lower transverse surface is flat.

20. A carrying device for carrying a preform in a temperature condition oven for blow forming containers made of thermoplastic material, the preform being obtained by injection molding and including a body with a tubular neck, the carrying device comprising:
   a gripping device having gripping claws which are closable around an outer surface of the neck to hold the preform; and
   an inner core which is adapted to penetrate axially inside the neck of the preform, the inner core having a lower transverse surface which, when the preform is in the gripping device, is substantially axially situated at a boundary between the neck and body of the preform,
   wherein the lower transverse surface forms a reflecting surface for reflecting the heating energy provided by the oven,
   wherein the gripping claws are made in the form of a bell open at the bottom, inside of which, the neck of the preform is axially engaged, the bell being provided with a series of radial slots that are angularly distributed so as to delimit, between two successive slots, one of the gripping claws, which is elastically radially deformable, and
   wherein a circular spring is provided which encircles the bell at a lower end of the claws to pull the claws radially inward.

21. A carrying device for carrying a preform in a temperature condition oven for blow forming containers made of thermoplastic material, the preform being obtained by injection molding and including a body with a tubular neck, the carrying device comprising:
   a gripping device having gripping claws which are closable around an outer surface of the neck to hold the preform;
   an inner core which is adapted to penetrate axially inside the neck of the preform, the inner core having a lower transverse surface which, when the preform is in the gripping device, is substantially axially situated at a boundary between the neck and body of the preform, the lower transverse surface forming a reflecting surface for reflecting the heating energy provided by the oven;
   an ejection means which is operable to loosen the preform from the gripping device, the ejection means being arranged above the gripping device and having at least one ejection finger which extends axially downward, such that the at least one ejection finger abuts an edge of the neck of the preform; and
   means for axially displacing the gripping device and the ejection means in such a way that, during a relative ejection stroke, the ejection finger is placed against the preform so as to move it axially downward with respect to the gripping device,
   wherein during a relative ejection stroke, the ejection finger passes through an orifice in an upper plate of the gripping bell and is received in an aperture made in a periphery of the core.

22. The carrying device according to claim 21, wherein the gripping device is rotatably mounted around its axis on the carrying device.

23. The carrying device according to claim 21, wherein the lower transverse surface of the inner core is disposed to be axially situated at a boundary between the neck and the body of the preform when the preform is in place on the gripping device.

24. The carrying device according to claim 21, wherein the lower transverse surface is flat.

25. A carrying device for carrying a preform in an oven, the preform including a body and a tubular neck, the carrying device comprising:
   a gripping device having gripping claws which enclose an outer surface of the neck to hold the preform, the gripping claws being made in the form of a bell open at the bottom, inside of which, the neck of the preform is axially engageable;
   an inner core which is adapted to penetrate axially inside the neck of the preform, the inner core having a lower transverse surface; and
   an ejection finger which extends downward such that during a relative ejection stroke, the ejection finger passes through an orifice in an upper plate of the gripping bell and is received in an opening made in a periphery of the core so as to press against the preform.

* * * * *